Figure 1:
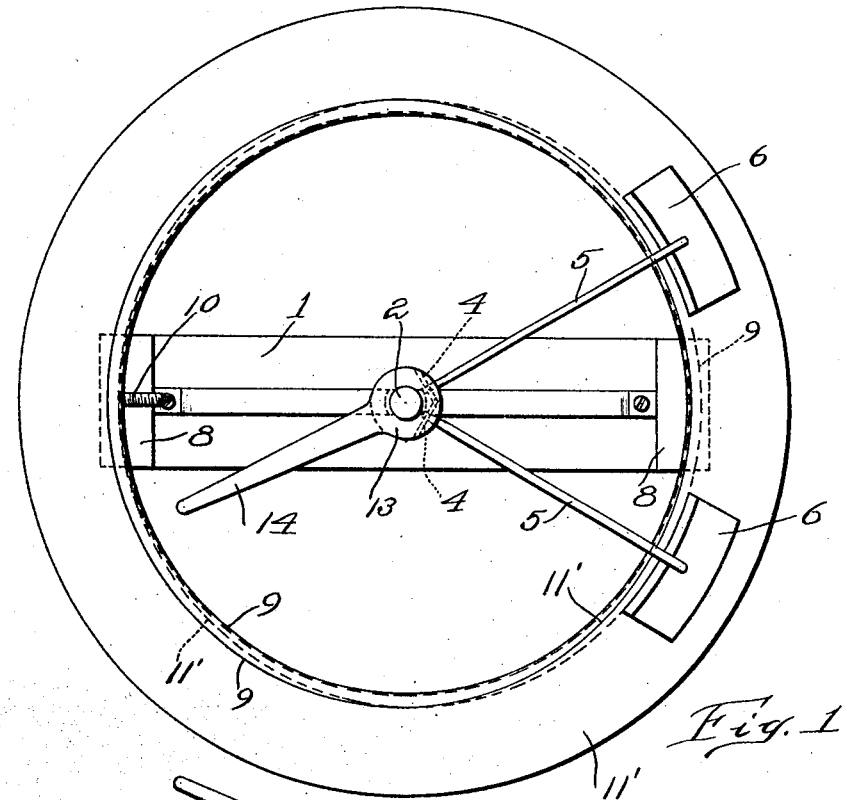

A. P. BERG.
RUBBER TIRE SETTER.
APPLICATION FILED AUG. 28, 1919.

1,394,400.

Patented Oct. 18, 1921.

Inventor:
Andrew P. Berg
By Geo. M. Woodworth
Att'y.

UNITED STATES PATENT OFFICE.

ANDREW P. BERG, OF STATEN ISLAND, NEW YORK.

RUBBER-TIRE SETTER.

1,394,400.     Specification of Letters Patent.     Patented Oct. 18, 1921.

Application filed August 28, 1919. Serial No. 320,467.

*To all whom it may concern:*

Be it known that I, ANDREW P. BERG, a citizen of the United States, and a resident of New Brighton, Staten Island, in the county of Richmond and State of New York, have invented a new and useful Improvement in Rubber-Tire Setters, of which the following is a specification.

My invention relates to automobile tire-jacks, and its object is to provide a simple apparatus whereby a tire, either of the clencher or straight sided type, may be conveniently mounted on its rim, without injury to the same.

One embodiment of my invention which has given good results in practice is shown in the accompanying drawings, although it will be understood that various modifications may be made in the precise form therein illustrated, without departing from the principle of the invention.

In the drawings,—

Figure 2:
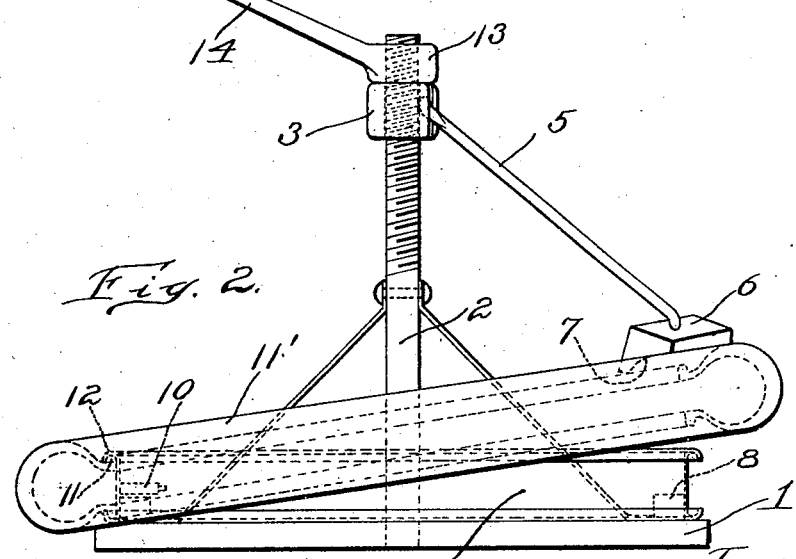

Figure 1 is a plan view of a tire-jack embodying my invention and illustrating its manner of use; and Fig. 2 is an elevation of the same.

In the particular drawings selected for more fully disclosing the present invention, 1 represents a suitable support member for the vertical standard 2 herein shown as a threaded stud on which the sleeve 3 is slidably mounted. Pivotally connected at 4, 4 to the sleeve are the arms 5, 5 herein shown as two in number, although it is to be understood that I do not limit myself in this respect. The lower end of each arm 5 is bent downwardly as shown and passes into a block 6, the outer surface 7 of which is curved to conform to the shape of the tire, and each block therefore is capable of movement about the lower end of its arm in a substantially horizontal plane so that it may be adjusted against the surface of the tire. Preferably the base 1 is provided with two lugs 8 for positioning the tire rim 9, shown in the present instance as a rim for a tire of the clencher type.

In order to mount a tire 11' on its rim by means of my improved jack, the valve 10 is first inserted through the opening in the rim provided for receiving the same and then the beads 11 adjacent thereto are inserted under the rings 12 of the rim, in the manner shown in the lefthand side of Fig. 2. The operator then mounts as much of the tire as convenient on the rim, and then, by means of a nut 13 provided with a laterally extending arm 14 forces the sleeve downwardly and the blocks downwardly and outwardly, and thereby places the rest of the tire in position on the rim.

As is well understood, the mounting of a tire on its rim is a somewhat difficult operation and requires the use of tools which sometimes have the effect of rupturing the inner tube. By means of the present invention it has been found possible to mount a tire on its rim with very slight effort and without any injury to the same.

For mounting straight sided tires, the base 1 is unnecessary, and, in such case, the lower end of the standard 2 may be temporarily attached to one of the spokes of the automobile wheel, as for example, by making the same with a terminal hook.

Having thus described an illustrative embodiment of my invention without however limiting the same thereto, what I claim and desire to secure by Letters Patent is:

1. An automobile rubber tire setter comprising a standard, means supporting the same, a sleeve slidably mounted on said standard, arms pivotally connected to said sleeve and extending downwardly and outwardly both on the same side of a diameter of the tire to be set, blocks attached to the outer ends of said arms, respectively, the outer surface of said blocks conforming to the shape of the tire and being arranged to press the tire outwardly and downwardly over the rim, means for forcing said sleeve longitudinally of said standard, and means interposed between the standard and its support for resisting the reaction of said arms on said standard.

2. An automobile rubber tire setter comprising a standard, means supporting the same, a sleeve slidably mounted on said standard, arms pivotally connected to said sleeve, the lower end portion of each arm being substantially vertical, blocks pivotally connected to the lower end portions of said arms, respectively, whereby each block is adapted to swing about the lower end of its arm in a substantially horizontal plane, the outer surface of each block conforming to the shape of the tire to be set, and means for forcing said sleeve longitudinally of said standard.

In testimony whereof, I have hereunto subscribed my name this 27th day of August, 1919.

ANDREW P. BERG.